United States Patent [19]
Zahn

[11] 4,167,256
[45] Sep. 11, 1979

[54] TAPE RECORDER/REPRODUCER FOR SELECTABLY OPERATING IN REEL-TO-REEL AND CASSETTE MODES

[75] Inventor: Heinrich Zahn, Rossdorf, Fed. Rep. of Germany

[73] Assignee: Robert Bosch GmbH, Stuttgart, Fed. Rep. of Germany

[21] Appl. No.: 839,801

[22] Filed: Oct. 6, 1977

[30] Foreign Application Priority Data

Oct. 8, 1976 [DE] Fed. Rep. of Germany ....... 2645421

[51] Int. Cl.$^2$ .............................................. G11B 23/10
[52] U.S. Cl. .................................... 242/194; 242/199; 360/85; 360/96.1
[58] Field of Search ............... 242/198, 199, 200, 194, 242/193, 201; 360/85, 132, 84, 93, 96

[56] References Cited
U.S. PATENT DOCUMENTS

| | | | |
|---|---|---|---|
| 3,516,146 | 6/1970 | Maxey | 360/84 X |
| 3,621,149 | 11/1971 | Wada | 360/84 |
| 3,791,609 | 2/1974 | Roma | 242/201 |
| 3,797,036 | 3/1974 | Eibensteiner | 242/199 |
| 4,008,489 | 2/1977 | Gilsdorf et al. | 242/194 |
| 4,008,490 | 2/1977 | Lemelson | 242/199 |

*Primary Examiner*—George F. Mautz
*Attorney, Agent, or Firm*—William R. Woodward

[57] ABSTRACT

The supply and take up reels for reel-to-reel operations are mounted on a base plate, one higher than the other, the base surface having a step. The equipment accepts the loading in of a cassette having its spools located one above the other in an axial direction, which is equipped with a front cover that opens out readily when the cassette is inserted and allows the tape to go into engagement with the transport mechanism. The insertion of a cassette operates a switch that disables the portion of the mechanism not used in operating with a cassette. A drive for at least one spool of the cassette is preferably provided.

4 Claims, 4 Drawing Figures

TAPE RECORDER/REPRODUCER FOR SELECTABLY OPERATING IN REEL-TO-REEL AND CASSETTE MODES

This invention concerns an apparatus for recording and/or reproducing television signals on or from a tape recording medium, capable of handling record tape both in the reel-to-reel mode of operation and in operation with a tape provided in a cassette. The recorder/reproducer accordingly has means for operating a supply reel and a take-up reel and also means for accepting and dealing with a cassette.

PRIOR ART

Among equipments used for recording and reproducing television signals on or from a magnetic tape record medium, there has been widespread use of so-called reel-to-reel devices on which the tape to be processed for recording or reproduction is loaded on a supply reel and has its leading end threaded through the magnetic heads of the equipment and transport mechanism and finally inserted in a take-up reel. On the other hand, for reasons of simpler handling of magnetic tape, cassettes have become known and used in which the magnetic tape is provided in a form already connected with both reels or spools within the cassette and needs only to be put as a unit in contact with the tape guide, often automatically once the insertion is started manually. Specialized recording and reproducing equipment have accordingly been provided for cassette recording and reproduction.

If television signals are recorded with such cassette equipment and are then desired to be processed with conventional reel-to-reel apparatus, it is then necessary to re-record the signals on the corresponding kind of reeled tape. The re-recording, however, brings in a certain quality deterioration and besides, the time delay involved restricts the utility of the device, for example for replay of current events recordings in a news program.

THE PRESENT INVENTION

It is an object of the present invention to provide a device that can readily be used either with cassettes or in reel-to-reel operation, so that re-recording becomes completely unnecessary.

Briefly, a recorder/reproducer for television signals is provided with a tape supply mechanism including a supply reel and a take-up mechanism including a take-up reel and also with an arrangement for seating a cassette and readily taking the tape therefrom to play it or record on it. The cassette in this case has its spools located one above the other in the axial direction and the supply and take-up reels for the reel-to-reel operation likewise are at different but adjacent levels, although not one above the other. The apparatus is preferably equipped with a base plate with respect to which the reel height can be adjusted for at least one of the reels. In one embodiment, the cassette seating is provided on the base plate between the hubs which are adapted to receive the reels for reel-to-reel operation. In other embodiments the cassette seating arrangement is mounted to one side from the base plate, or to the rear. In one embodiment the open reels or the cassette spools are equipped with mechanical storage devices, usually springs, so that the energy for driving the supply and take-up spools can be transmitted from the tape drive through the tape. In other embodiments motors are provided for the reels with an arrangement for cutting off their energy supply when the cassette is mounted in place; and at least one shaft projecting through a base plate on which the cassette can be mounted is provided for driving a cassette spool.

Drawings, showing illustrative embodiments:

The same or equivalent parts are designated with the same reference numerals in the various figures.

DESCRIPTION

Figure 1:
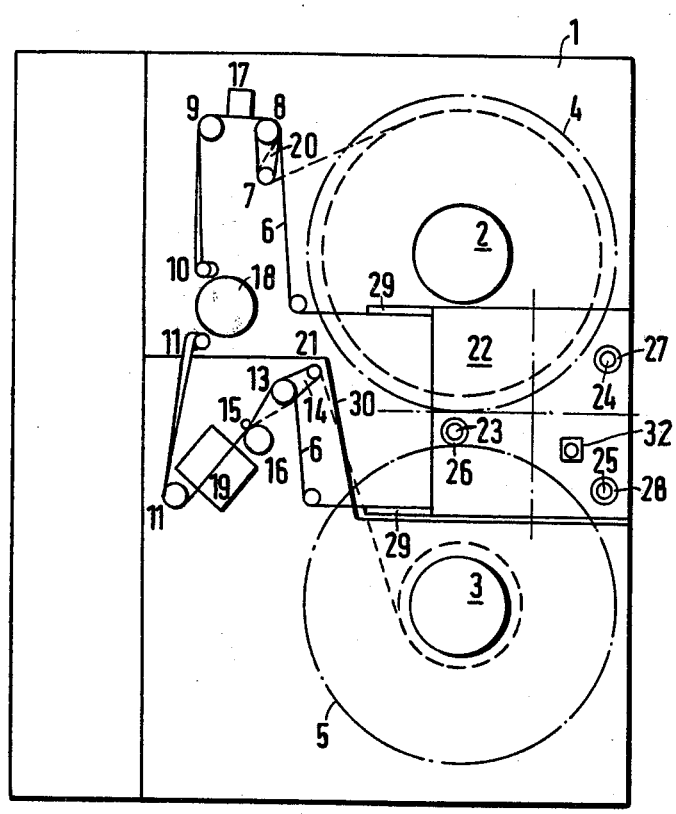
FIG. 1 shows an embodiment of the invention in which a cassette can be seated on the base plate that carries the reels for reel-to-reel operation.

Reeling devices 2 and 3 are provided on a base plate 1, as shown in FIG. 1, for a supply reel 4 and a take-up reel 5. In operation of the apparatus, the tape 6 is caused to proceed from the supply reel 4, around the guide rolls or pulleys 7, 8, 9, 10, 11, 12, 13 and 14 to the take-up reel 5. The controlled tape movement is performed in a manner known in itself by means of a tape drive roller 15 against which the tape is pressed by means of a pressure roller 16. The tape is caused to pass by the erase head 17, the pick-up device 18 and other magnetic heads 19, which form no part of this invention and are therefore not further described.

The torque of the reel motors, that are not shown in the drawings, is controlled for regulation of the tape tension by the fact that the rollers 7 and 14 are mounted on tape tension levers 20 and 21. The course of the tape at those places where it deviates in reel-to-reel operation from the course in the case of operation with a cassette, is drawn in dashed lines.

For cassette operation, the reels 4 and 5 are removed and a tape cassette 22 is put in position. For seating the cassette there are in the example shown in FIG. 2 three rods or studs 23, 24 and 25 that project up out of the base plate 1 and fit into corresponding cavities in the underside of the cassette. For arresting the cassette in its upper position, springs not shown in the drawing can be used that catch in corresponding grooves of the rods 23, 24 and 25. For precise determination of the vertical position of the cassette, the rods or studs 23, 24 and 25 have seating surfaces 26, 27 and 28 that can usefully be made adjustable, as can be done for example, by providing the seating surface on the end or face of a nut and providing a part of the rods or studs with threads on which such a nut may be threaded. The cassette 22 is equipped with a front cover 29 made of two parts that is automatically opened by inserting the cassette and thereby makes the tape accessible or actually releases it.

For example cassettes have become known as the result of German Published Patent Application No. 24 60 096 in which no individual drive for take-up of the tape is necessary. This results rather from the tape transport outside the cassette with cooperation of a spring mechanism that provides for a tape tension that is to a considerable extent constant. For utilizing such cassettes there is therefore no need for a separate drive for the spools inside a cassette, so that the tension sensing levers 20 and 21 provided for tape tension regulation when the tape is threaded through from reel to reel can be bypassed. By a suitably arranged switch the drive motors for the reels 4 and 5 as well as by any other components not necessary in the case of cassette operation, can be switched off. If cassettes are used that require a separate spool drive, such a drive can conveniently be provided at a suitable place below the base plate and can be provided in a well known way with a drive shaft that engages into the hub of a spool. For forward and backward tape transport operation, it is also possible to provide concentric drive shafts for the two directions that are alternately shifted into operating position.

Figure 2:
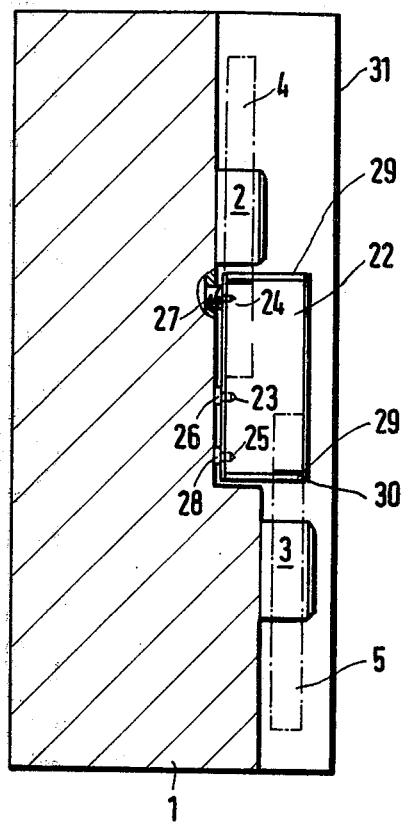
FIG. 2 shows a side view of a part of the embodiment of FIG. 1.

FIG. 2 shows a side view of the arrangement of FIG. 1 in which parts of the transport mechanism, namely the path determining and driving rollers, as well as the pick-up head, have been left out for clarity.

The following general remarks are provided as a preface to the explanation of FIG. 2.

In the case of magnetic recording devices of the oblique track recording mode a distinction is drawn between tape systems in which spools or reels are arranged in the same plane and those, on the other hand, in which a height difference between the two reels is present that amounts to somewhat more than the width of the tape. The latter construction type is utilized in the illustrated examples, for which reason the base plate 1 is provided with a step of corresponding height having the contour of the line designated 30 in the drawing. It is for this reason advantageous to utilize a cassette in which the spools therein are arranged one above the other (in the axial direction). As is evident from FIG. 2, such a cassette fits in a favorable way to the form of the tape transport equipment, so that it is possible in the embodiment illustrated in FIG. 1 and FIG. 2 to use the cassette also when the protective cover 31 is used, to operate the cassette in a closed chamber.

Figure 3:
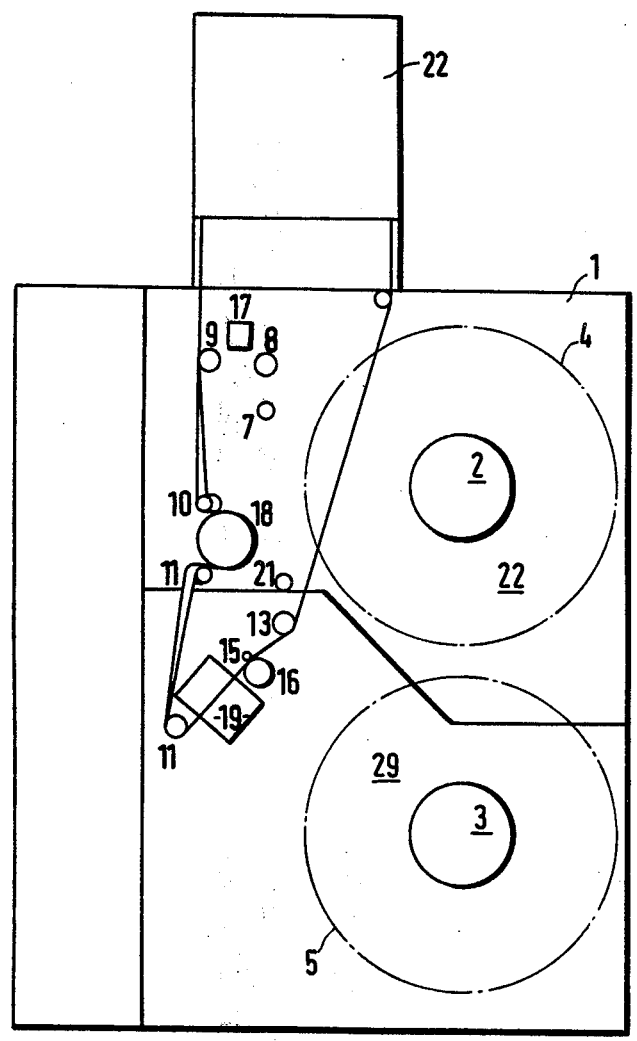
FIG. 3 shows another illustrative embodiment in which the cassette is arranged at the side of the base plate.
Figure 4:
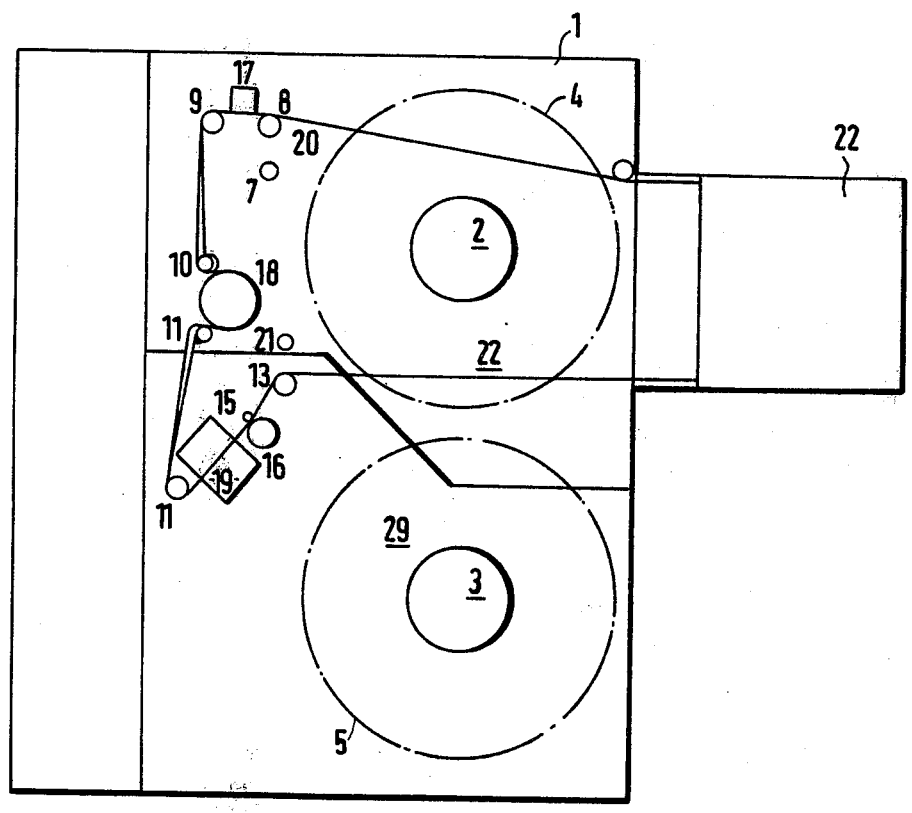
FIG. 4 shows still another illustrative embodiment in which the cassette is arranged rearwardly of the base plate.

The arrangements according to FIGS. 3 and 4 are distinguished from the arrangement according to FIGS. 1 and 2 in that the cassette 22 is mounted outside the region of the base plate. In the arrangement of FIG. 3, it is mounted off to one side from the base plate and in the arrangement according to FIG. 4, on the rear side of the base plate. These solutions can become particularly important in cases in which existing magnetic tape devices are modified for utilization of cassettes.

In FIG. 1 a switch 32 is shown against which the underside of the cassette exerts pressure when the cassette is inserted, as a result of which, as already mentioned above, the reel drive motors, and if desired other parts not needed for operation with cassettes can be switched off.

Although the invention has been described with reference to particular illustrative embodiments, modifications are possible within the inventive concept.

I claim:

1. Apparatus for recording and/or reproducing television signals respectively on and from a tape record medium having recording and/or reproducing transducers and a tape drive mechanism for transporting a tape record medium past said transducers and also comprising:

reel-to-reel tape payout means, including a tape supply reel and a hub for mounting the same, for causing the tape record medium to be paid out from said tape supply reel as required by said tape drive mechanism;

reel-to-reel take-up means, including a take-up reel and a hub for mounting the same, for causing the tape record medium to be taken up from said tape drive mechanism onto said take-up reel, said take-up reel when mounted on said hub therefor having an axis of rotation parallel to that of said supply reel and the hub therefor and located so as to pass outside the periphery of said supply reel when the latter is mounted on the hub for it, and said take-up reel being also located substantially entirely at a different axial level from that occupied by said supply reel and means (23–28) for seating a two-spool tape cassette that has its spools arranged therein coaxially and one above the other in a cassette seating position which is at least in part between said hubs, entirely clear of the locations of said hubs, and faces the cassette in a direction suitable for extracting a portion of the tape thereof for application of said tape drive thereto.

2. Apparatus as defined in claim 1, comprising also a base plate above which said reels are located and in which said cassette seating means is located on said base plate.

3. Apparatus as defined in claim 2, in which said cassette seating means (23–28) on said base plate comprises at least one member (23–25) projecting up out of said base plate for engaging into a cassette.

4. Apparatus as defined in claim 3, in which said members of said cassette seating means projecting up from said base plate consist essentially of three rods.

* * * * *